United States Patent [19]

Lake

[11] Patent Number: 4,551,084
[45] Date of Patent: Nov. 5, 1985

[54] CONVERTIBLE MOLD

[75] Inventor: Connie Lake, Tinley Park, Ill.

[73] Assignee: Creative Industries, Inc., Bridgeview, Ill.

[21] Appl. No.: 497,843

[22] Filed: May 25, 1983

[51] Int. Cl.⁴ .............................................. B29C 1/00
[52] U.S. Cl. .................................... 425/185; 249/102; 425/403
[58] Field of Search ................ 264/293; 249/102, 103, 249/104, 112; 425/185, 403

[56] References Cited

U.S. PATENT DOCUMENTS

| | | | |
|---|---|---|---|
| 2,291,580 | 7/1942 | Poglein | 249/102 |
| 3,380,121 | 4/1968 | Chittenden et al. | 425/408 |
| 3,496,607 | 2/1970 | Larson | 249/102 |
| 3,861,640 | 1/1975 | Agneta | 249/102 |
| 3,871,611 | 3/1975 | Taketa | 249/102 |
| 4,155,692 | 5/1979 | Kermoian | 425/292 |
| 4,202,522 | 5/1980 | Hanas et al. | 425/185 |
| 4,289,473 | 9/1981 | Von Holdt | 425/567 |
| 4,402,657 | 9/1983 | Laghi | 425/183 |
| 4,416,603 | 11/1983 | Peltsman et al. | 425/153 |

Primary Examiner—Jay H. Woo
Assistant Examiner—Timothy W. Heitbrink
Attorney, Agent, or Firm—Hill, Van Santen, Steadman & Simpson

[57] ABSTRACT

A plastic molding apparatus for forming three-dimensional containers from a single sheet of plastic material and each comprising side-by-side generally dish-shaped members which are hinged together which dish-shaped members have different interior configurations with respect to one another. The apparatus comprises a pair of superimposed relatively movable male and female mold members. A pair of differently configurated side-by-side mold sets are carried by the mold members. A first plurality of different inserts having different projecting configurations are provided for said first mold set. A second plurality of different inserts are provided for the second set which have surface complementary to the first projecting inserts to establish a male-female mold relationship between the first and second plurality of inserts. Quick change means are provided for individually detachably securing the first and second inserts to the associated male and female mold members and thus enabling the molds to produce containers having variable predetermined physical characteristics. Means is provided on the mold members between the pairs of mold sets for producing a hinge between the dish-shaped members. Power means is provided for operating the mold members to produce the hingedly connected side-by-side dish-shaped members from the single sheet of material positioned therebetween.

19 Claims, 18 Drawing Figures

CONVERTIBLE MOLD

THE FIELD OF THE INVENTION

The present invention relates generally to apparatus and method for the manufacture of synthetic plastic food containers of the type used in the fast foods industry and also to a new and improved synthetic plastic food container having a three-dimensional configuration with sockets or indentations in one of the container members or the lid for supporting beverage cups.

THE PRIOR ART

Examples of prior art apparatus and processes are in to Lake U.S. Pat. No. 4,242,074; to Lake; to Kermoian U.S. Pat. No. 4,155,692; to Lake U.S. Pat. No. 4,302,415; to Lake U.S. Pat. No. 4,304,747; to Fowler U.S. Pat. No. 3,135,998; and to Chittenden, et al U.S. Pat. No. 3,380,121. These patents show various methods and apparatuses for forming food containers from synthetic plastic or thermoplastic foam material. The Fowler '998 patent shows the use of replaceable elements in a main molding form itself and the Chittenden '121 patent shows the use of inserts. Further, molding inserts in the formation of closing cartons are also known, such as for example, shown by the embossing plates at the bottom of the female cavity in the Kermoian '692 patent. It is also known to use replaceable inserts for wear parts in some forms of injection molding molds. Additionally, metal drawing and stamping molds have historically been made of many individual parts which are individually replaceable.

SUMMARY OF THE INVENTION

According to my invention, I have provided a new and improved apparatus for the manufacture of expanded foam products from suitable materials such as synthetic plastic and the like. The plastic material may be polystyrene or polyethylene foam of various densities, although it need not necessary be a foam material, and where a sheen is required, may have a lamina of high density polystyrene film on one side thereof which may be an oriented thermoplastic film.

Standard molds have in the past been formed to produce a single product shape with a change-over in product being run on the press requiring a change-over of both male and female molds. The beginning point of differentiation here is the recognition that the outer boundary outlines can be set by a boundary portion of the mold and the internal configuration of the product can be determined by providing removable base portions or removable inserts in the base portions on the molds. To this end there are two considerations. The first is a removable base section of the mold itself which is insertable into the boundary section and which can be used to change the depth of the draw of the foam to change the height of the completed unit. This would require the entire base bottom to be removed.

The second consideration is to be able to provide different interior dividers in the containers so that one container may have a totally open interior whereas alternative containers may be divided into two or three sections such as might be used today in the fast food chicken establishments where one section would be used for chicken and one would be used for mashed potatoes and one would be used for rolls or the like. Modified containers can now be manufactured without changing molds simply by the inclusion of inserts. According to my invention, each mold comprises a male and female set and where an insert is changed in one mold it must also be changed in the corresponding opposed mold.

The insert changes as well as the base change can all conveniently be made by my new mechanical interlock feature. This mechanical interlock feature consists of through bars or rods that extend either through the main peripheral base which is the fixed portion of the mold set that never changes, or through some common base on which the peripheral base is affixed. To this end all of the inserts will have projecting cylindrical members terminating in the bottom most portions in a cylindrical opening through which a locking bar or rod can be inserted to lock them in place, the bar being journalled in the fixed portion of the mold.

Each of the inserts is therefore dependent on the design of the cooperating base or bottom portion. The bottom must have openings for receipt of the lock pin or cylindrical projections of each of the inserts. However, when an insert is not used there must be a complementary insert or blind lock pin to fill the hole in the base. That blind lock then will also be locked in place by the bars such that all of the bars would be used at each time.

My invention further recognizes that not only can the interior configuration be changed, but that any change in the interior configuration necessitates the change in the exterior configuration since I am using male and female molds. It is here contemplated for the first time that food containers can be provided having cup receptacles molded into the top by use of the same style of insert. Since in the tri-divided type of container where the chicken is in the major portion of the container and the mashed potatoes and rolls or beans or whatever they are, are in the back section toward the hinge of the container, the product that goes in the smaller section generally does not extend above the lip level of the container. This allows the inventor to provide space in the top for impression of the cup receiving receptacles. Two sizes are used to allow usage with two standard size cups in fast food chains. The other size receptacle, which would not be receiving a cup would then be available for receipt of condiment packages or the like.

According to important features of my invention I have provided a plastic molding apparatus for forming three-dimensional containers from a single sheet of synthetic plastic material and each comprising side-by-side generally dish-shaped container members which are hinged together which dish-shaped members have different interior configuration with respect to one another and which apparatus further comprises a pair of superimposed relatively movable male and female mold members, a pair of differently configurated side-by-side mold sets carried by the mold members, a first plurality of different inserts having different projecting configurations for the first mold set, a second plurality of different inserts for the second set and having surfaces complementary to the first projecting inserts to establish a male-female mold relationship between the first and second plurality of inserts, quick change means for individually detachably securing the first and second inserts to the associated male and female mold members and thus enabling the molds to produce containers having variable predetermined physical characteristics, means on the mold members between the pairs of mold sets for producing a hinge between the dish-shaped members, and power means for operating the mold members to produce the hingedly connected side-by-side dish-shaped members from the single sheet of synthetic plastic material positioned therebetween.

Yet other features of my invention concern a new and improved molded synthetic plastic food container having an inverted dish-shaped closure cover lid and a dish-shaped container bottom formed from a single sheet of material and a hinge joining the lid and the bottom at a rear side of the container, disengageable latch means provided between the bottom and the cover at a front side of the container, and cup support means comprising a dish-shaped indentation in the inverted dish-shaped closure with the dish-shaped indentation extending into a cavity defined between the dish-shaped container bottom and the inverted dishshaped closure.

Yet other features of my invention concern a new and improved method for forming containers from a sheet of synthetic plastic material which containers have different interior configurations, the method comprising the steps of providing opposed relatively movable male and female sets, providing bottom means for each of the mold sets, providing means for attaching inserts to the bottom means, providing a first plurality of different inserts having different projecting configurations, providing a second plurality of different inserts having surfaces complementary to the projecting inserts to establish a male-female mold relationship between the first and second plurality of inserts, selecting a first group of inserts consisting of at least one of the first plurality of inserts and one of the second plurality of inserts, attaching the first group to the bottom portions, operating the male and female molds to produce a container from sheet material positioned between the ma: and female molds, the container having a first interior configuration, thereafter removing the first group of inserts from the bottom portions, selecting a second group of inserts for forming a container having a second configuration, attaching the second group to the bottom portions, molding a second container from sheet material position between the male and female molds having a second configuration different than the interior configuration of the first container.

DESCRIPTION OF THE DRAWINGS:

Other objects and features of the present invention will more fully become apparent in view of the following detailed discussion of the drawings wherein several embodiments are illustrated, as follows.

DESCRIPTION OF THE PREFERRED EMBODIMENTS

Figure 2:
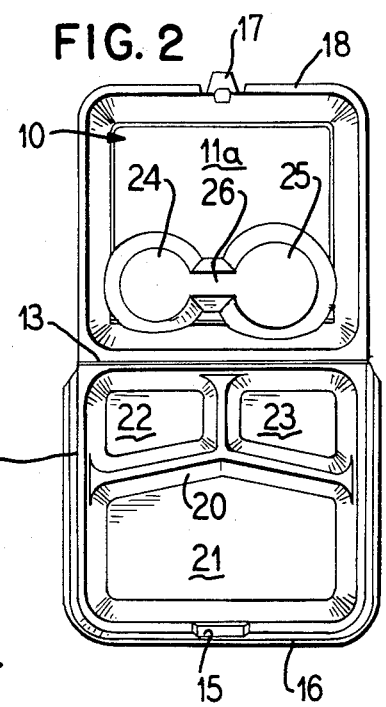
FIG. 2 is a plan view of the container shown in FIG. 1 only illustrated in an open position and illustrating the bottom cover section with three compartment food receiving cavities.

The reference numeral 10 indicates generally a synthetic plastic food container which embodies important features of my invention. The container 10 is comprised of a pair of generally dish-shaped container members 11 and 12. These container members 11 and 12 are hingedly connected along a common rear edge at 13 as shown in FIG. 2. A latch 14 is provided at a forward edge of the containers 11 and 12 and comprises a slot 15 in a forward edge 16 of the container 12. The latch 14 also includes a flexible tab 17 provided in a forward edge of the container 11. The tab 17 is of a wedge shape construction and is positioned for engagement in the slot 15 to secure the uphinged sides of the containers 11 and 12 to hold the contents of the fgod container 10 in secured protected relation.

Figure 3:
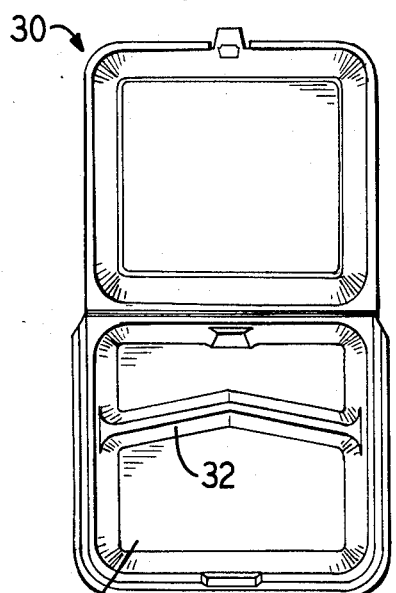
FIG. 3 is a plan view of a modified type of food container similar to the one shown in FIG. 2 only with the top cover left free of indentations for supporting other articles and having two compartment food receiving cavities.
Figure 4:
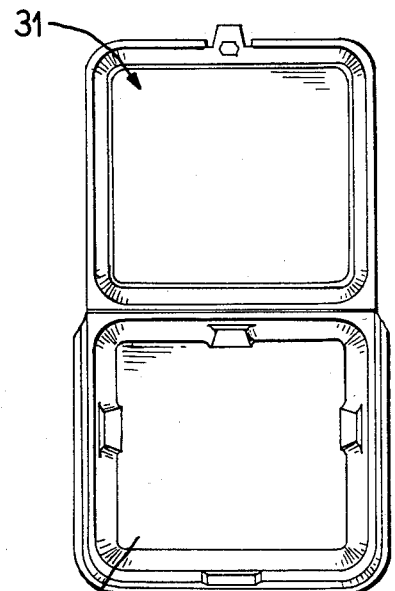
FIG. 4 is a plan view of still another type of food container similar to those shown in FIGS. 2 and 3 only with the bottom cover section having only a single food receiving cavity and being free of multiple compartments.

In order to permit different types of food to be placed into the food container 10, the lower container 12 is compartmentalized and the compartmentilization may take different forms as desired and as is illustrated in FIGS. 2, 3 and 4. In FIG. 2, the container has a three-legged divider 20 which permits the dishshaped member 11 to be provided with three separate food compartments as indicated at 21, 22 and 23, with the larger compartment 21 being constructed to receive the entree of a food serving with the smaller compartments 22 and 23 being provided for salad and vegetable and the like.

Figure 1:
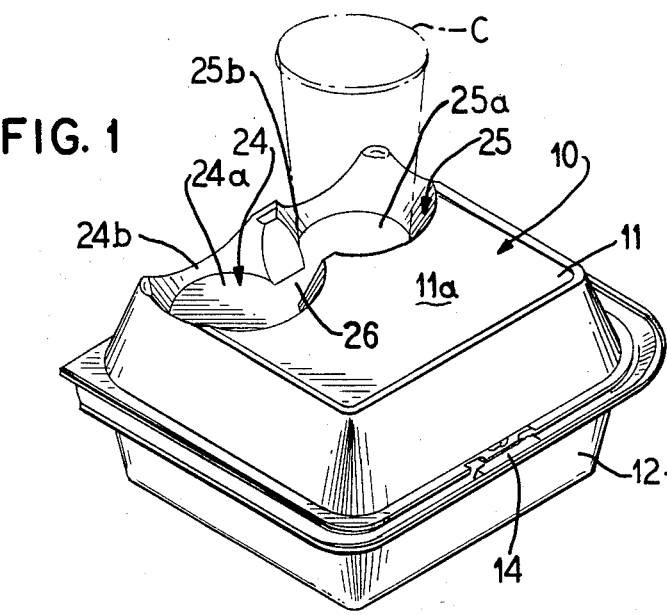
FIG. 1 is a perspective view of a food container having food cover holders for carrying other articles.

It will further be noted that the container 10 has a pair of beverage cup-receiving pockets or dish-shaped indentations 24 and 25 (FIGS. 1 and 2) for receiving a cup C such as is illustrated in FIG. 1, which construction embodies features of my invention. The indentations 24 and 25 can be used for a pair of cups or for other assorted items, such as packages of condiment, salt, pepper and the like. The depth of the dish-shaped indentation is such that bottoms 24a and 25a are disposed in a plane lying above the food divider 20 provided in the lower container member 12 so as not to interfere with the placement of foods in the compartments 22 and 23. These cup-receiving dish-shaped pockets or members 22 and 23 are most desirably located in adjacency to the hinged area 13 of the container 10 so that where the entree is located in the food compartment 21 in the lower member 12 then the entree can project upwardly and into the area confined and closed by the upper dish-shaped container member 11 when this upper member is positioned in its closed position.

It will be noted from a consideration of FIGS. 1 and 2 that the dish-shaped cup holders or indentations are of varying sizes for different size cups. Still further, the cup holders 24 and 25 are of a frusto-conical shape as the shading lines illustrate in FIG. 2. The larger diameter of the frusto-conical shaped holders lies in the plane of the bottom or top 11a (depending on which way you are looking at the container member 11) as generally shown in FIG. 1. These cup-shaped indentations or holders 24 and 25 are linked by a land 26. The land 26 serves to increase the overall size of the combined holder areas defined by the indentations or holders 24 and 25 so that additional storage area is provided may be useful if both cup holders 24 and 25 are used for carrying cups in which case the condiments could be carried on the land area 26. It will further be appreciated that if only one cup holder were desired then only one be formed. Still further, if some other shape were desired in place of the frusto-conical shape, then the molding apparatus could be varied. As a still further feature, it will be observed that the container member 11, and specifically the indentations 24 and 25, have a pair of arcuate rear edges 24b and 25b both of which lie beneath the plane of the top surface 11a as viewed in FIG. 1. By lowering the level of the rear edges of the cup holders 24 and 25, the cups C can be more readily removed from a supported position on the container 10.

It will be further appreciated that the cup holders 24 and 25 have lapped diameters and that the land or land area 26 is defined in the area of the lapped diameters. It will further be noted that in the preferred form, a pair of the cup holders have been formed in side-by-side relation. Obviously, the cup holders could be differently positioned on the lid or container member 11 as may be desired.

In FIGS. 3 and 4, the construction of the food containers are varied. For purposes of identification, these containers are indicated at 30 and 31. The containers 30 and 31 are identical to the container 10, except that the cup holders 24 and 25 have been omitted and the construction of the dividers has been changed or omitted. With the food container 30, a modified two-legged divider 32 is provided for dividing the lower dish-shaped container member 33 into two compartments rather than three compartments as shown in FIG. 2. With the container 31, the lower dish-shaped container member 34 is left open and free of any dividers.

Now before a detailed description of the method and apparatus features are given, it will be appreciated that all three food containers 10, 30 and 31 lend themselves to being manufactured by the apparatus and method as hereafter described.

Figure 5:
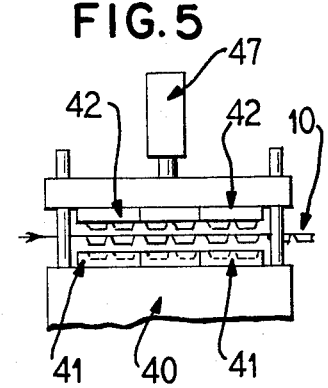
FIG. 5 is a fragmentary side view of an apparatus for forming food containers of the type shown in FIGS. 1-4.
Figure 5A:
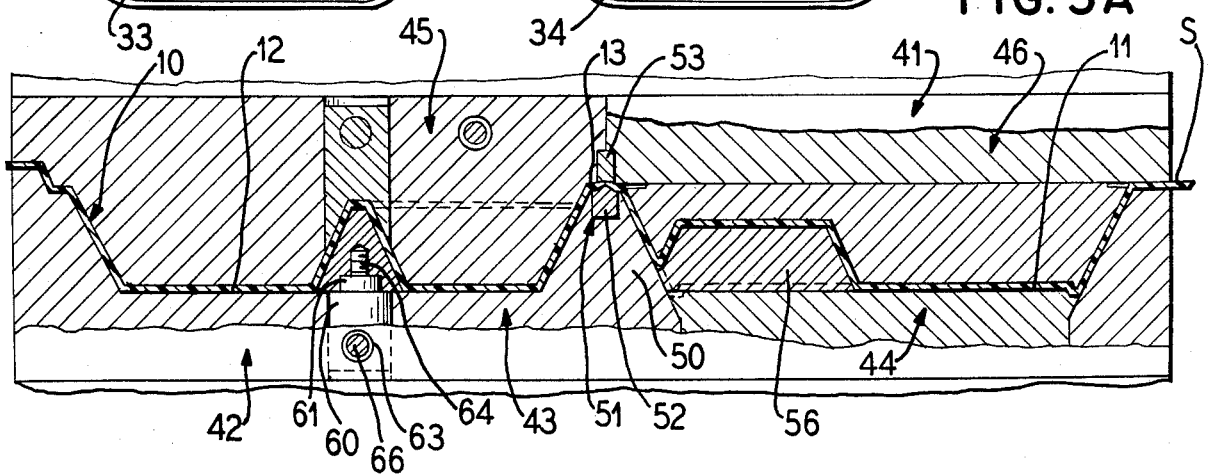
FIG. 5A is a fragmentary vertical section through a matched mold forming apparatus shown in FIG. 5 and used to thermoform containers of the type shown in FIGS. 1-4, but specifically illustrating the container of FIG. 2.

The reference numeral 40 identifies a plastic molding apparatus as seen in FIGS. 5 and 5A. This apparatus or press embodies important features of my invention and is adapted for forming three-dimensional containers as are illustrated in FIGS. 1–4 and as are identified at 10, 30 and 31. As seen in FIG. 5A, the single sheet of synthetic plastic material S is formed while in a hot pliable state into side-by-side generally dish-shaped container members 11 and 12 which together comprise the container 10.

Figure 9:
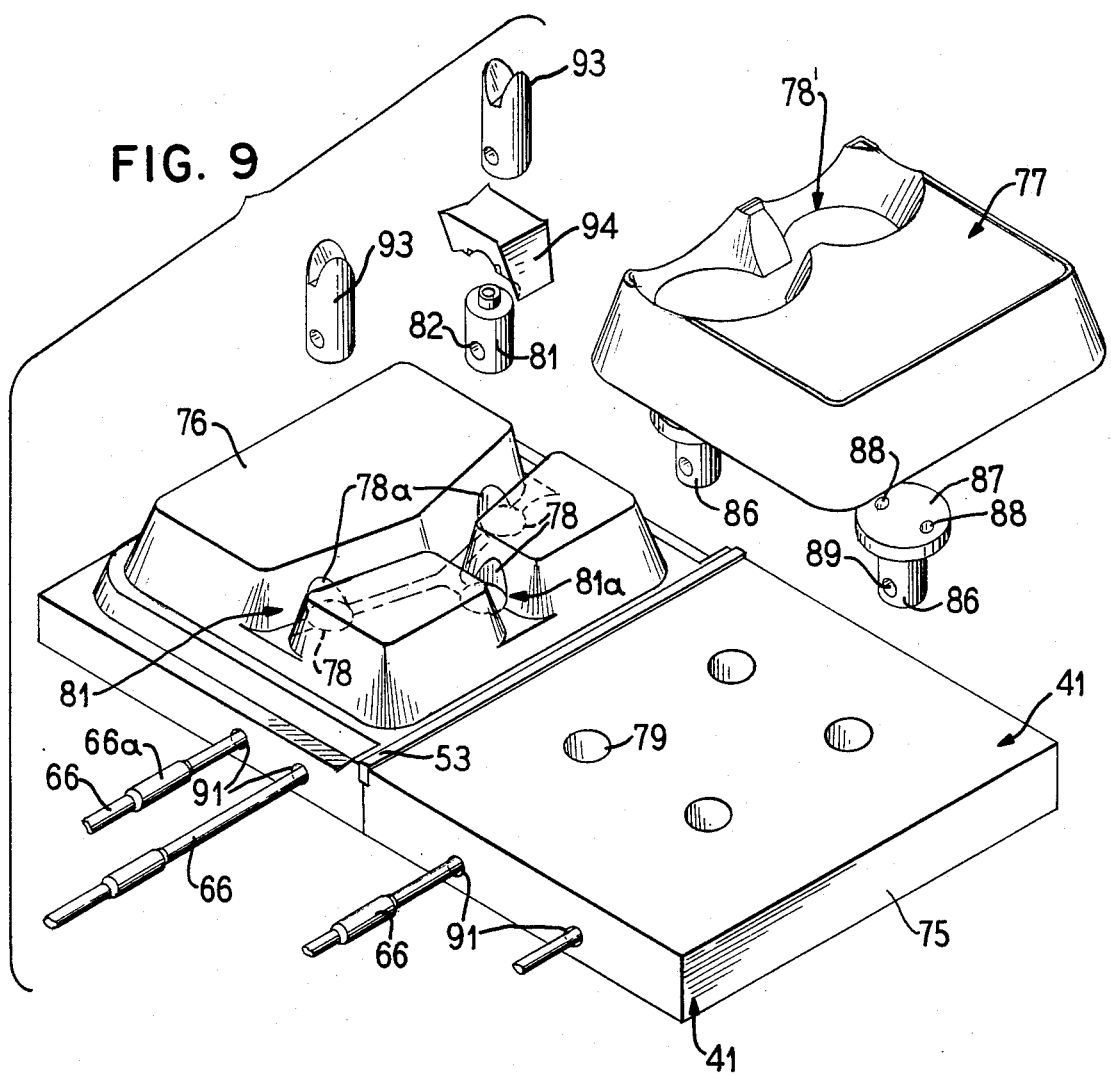
FIG. 9 is an exploded perspective view of the thermoforming male mold illustrated in FIG. 5A.

The apparatus 40 includes realtively movable male and female mold members 41 and 42 as seen in FIGS. 5 and 5A. A pair of differently configured side-by-side mold sets 43 and 44, are carried by the mold members 41 and 42. These mold members when actuated by power means 47 cause the mold sets to come together to produce the containers 10 as illustrated in FIG. 5. Where a series of mold sets are assembled on the apparatus 40 it will be seen that a plurality of containers 10 can be simultaneously manufactured. The female mold member 42 is further illustrated in an exploded view in FIG. 6. The mold or mold 42 includes a pair of side-by-side female mold cavities 48 and 49 which are separated by a dividing wall 50. A bevel edged creasing knife 52 is mounted on top of the dividing wall 50 which knife constitutes part of the creasing knife assembly 51 for forming the hinge in the food container 10. The other part of the knife assembly 51 comprises the urethane creasing knife 53 as shown in FIG. 9. It will be observed from FIG. 5A that the knife assembly operates to crease the plastic sheet as to form the hinge 13.

The female mold 42 is possessed of a first plurality of different inserts 55, 56, 57 and 58, having different projecting configurations for the purpose of assisting in the molding of the three-dimensional container 10. To this end, the insert member 55 is of the shape to provide an inside divider wall in the container 10 as illustrated at 32 in FIG. 3. The inserts 56, 57 and 58 are of varying configurations to assist in the formation of the cup holders 24 and 25 in the dish-shaped container member 11. More particularly, the insert 58 is provided to assist in the formation of the land provided between the cup holders 24 and 25.

Figure 7:
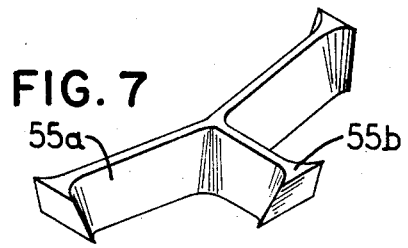
FIG. 7 is a perspective view of a mold insert member used to modify the female mold to produce a triple compartment container of the type illustrated in FIG. 2.
Figure 8:
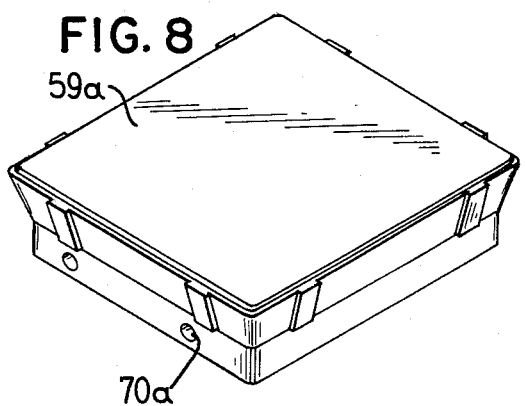
FIG. 8 is a perspective view of a mold insert member used to modify the female mold to form the top cover of the container illustrated in FIG. 4.

Still another insert 59 is provided for the mold cavity 49 which is a parallel-sided female cover insert and it is used as a support for the other cover mold inserts 56, 57 and 58, which are attached to it by fasteners as will be further described hereafter. In FIGS. 7 and 8, modified inserts 55a and 59a can be used in place of the inserts 55 and 59 to achieve different results in terms of the shape of the container being molded in the molding operation. The female mold insert 55a is used in connection with the formation of a container member having a triple food compartment as is illustrated in FIG. 2. In this respect, the insert 55 serves to assist in the formation of a divided food container member of the type indicated at 33 with the divider 32 as is illustrated in FIG. 3.

The female cover insert 59a is of a greater vertical dimension so as to enable the size of the package to be molded to have a varied dimension over the one that would be produced by using the insert 59. Thus, where the insert 59a is used in the female cavity 49 in the press 40 (FIG. 5), a food package can be produced having a smaller interior dimension since the molded container will not be as greatly dished with the use of this type of an insert.

Figure 6:
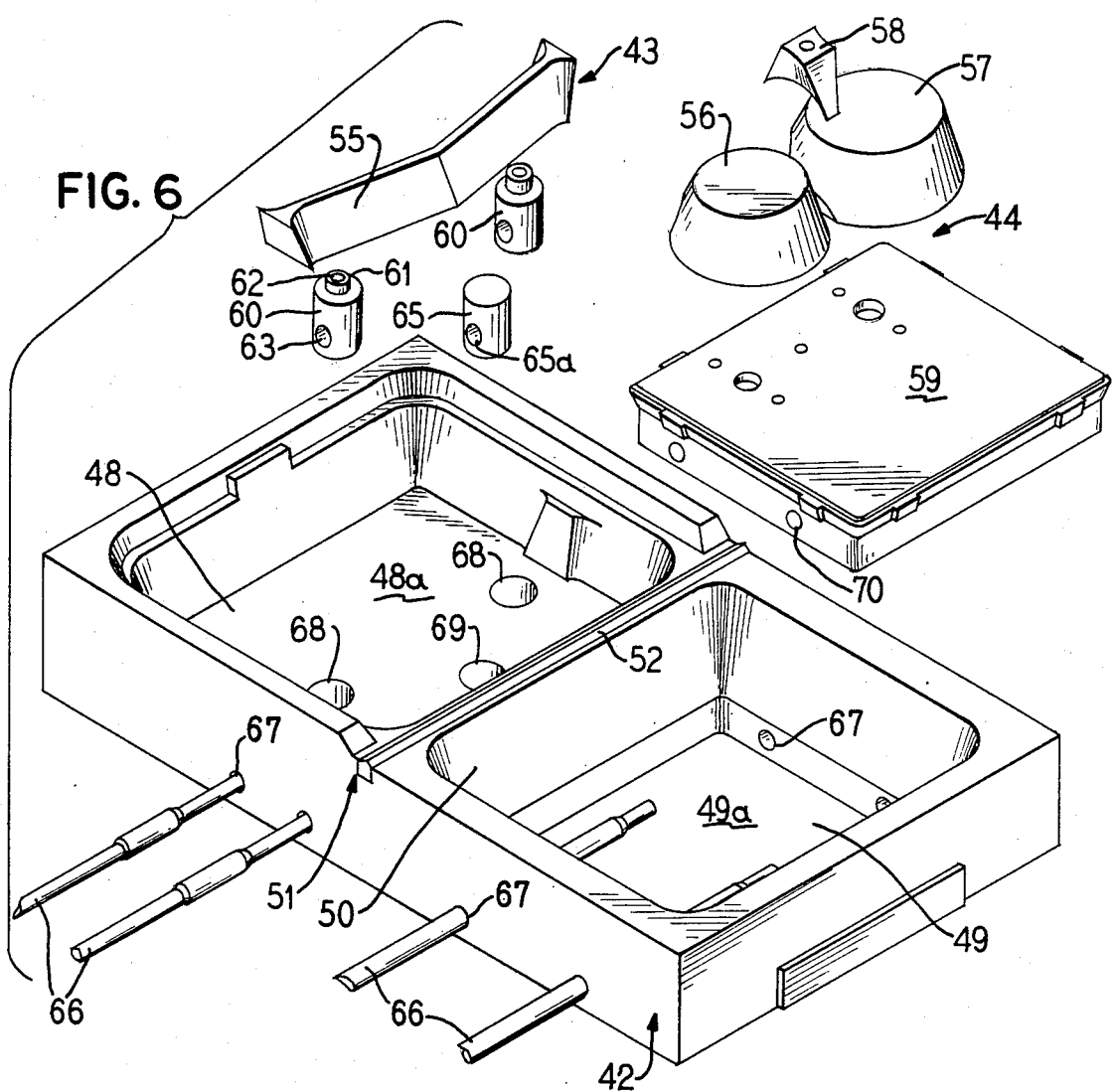
FIG. 6 is an exploded perspective view of portions of the thermoforming female mold illustrated in FIG. 5A.

Also shown in FIG. 6 are various types of insert attachment bosses or plugs as indicated at 60 and 65. The boss 60 is tubular and has a reduced end 61 and a tubular opening 62 for receipt of an attachment bolt 64 (FIG. 5A) for securing the boss to the insert to which it is to be attached. The boss 60 is also provided with a horizontally extending opening which extends through the opposite circumferential surfaces of the boss so that a locking rod 66 can extend through mold openings 67 and then through the openings 63 to thereby attach the insert to the bottom of the female mold member 42. Before the locking rod 66 is inserted into the opening 67 the bosses 60 and the plug 65 should be seated into boss sockets 68 and a plug socket 69 so that a single rod can be used to lock all of these components comprising parts of the mold set to be locked.

The plug 65 has a similar horizontally extending opening for receipt of the locking rod so that the plug can be locked in position inside of the cavity 48. Any suitable number of the bosses 60 may be provided, as may be required to properly anchor anyone of the inserts such as inserts 55, 56, 57, 58, 59 and 59a into the mold cavity where such inserts are to be used where and when required.

With respect to the bosses 60 and the plug 65 it will be appreciated that where a divider of the type shown at 55 is used only two bosses 60—60 are required to anchor the divider to a bottom 48a of the mold cavity thus leaving an open hole 69. For the purposes of molding, this open socket 69 must be plugged and for this reason the plug 65 is employed. Where, however, the divider 55a is employed, the additional boss 60 would be required to fix the position of the additional divider leg 55b and for this purpose another boss 60 would be put into the socket 69 instead of the plug 65. A series of threaded bolts of different sizes 71 are used to secure the bosses 60—60 to the various components of the mold set.

Now where either of the female cover inserts 59 or 59a are to be locked, the locking rods work in the same way as previously described. To this end, the locking rods extend through opening 67 into female cover insert openings 70 and 70a (FIGS. 6 and 8) to thereby lock the respective insert into position relative to a mold cavity bottom 49a.

The rods 66 provide quick change means for individually detachably securing the inserts 55, 55a, 56, 57, 58, 59, 59a, 60 and 65 into the mold cavities 48 and 49. These inserts comprise female portions of the mold sets 43 and 44. By using the rod 66 as quick change means in the manner described, these molds and the molds or inserts usable with them can be easily interchanged and operated with the male mold 41 to produce containers having variable predetermined physical characteristics in accordance with the requirements of the manufacturer.

Attention is now directed to FIG. 9 where the male mold 41 is illustrated in an exploded position. Mold 41 includes a male mold base plate 75 which carries a male tri-compartment forming mold 76 at one end and a male cover forming mold 77 at an opposite end. The mold 77 also has a cup holder forming section indicated generally at 78' which can be optionally used to form certain types of containers 10 where it is desired to provide such containers with the cup holders 24 and 25, as previously described.

Figure 10:
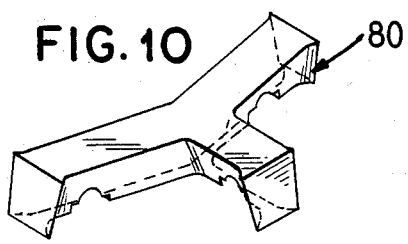
FIG. 10 is a perspective view of a mold insert member used to modify the male mold to produce a single cavity container.
Figure 11:
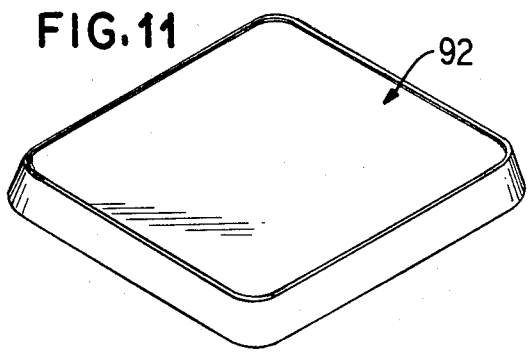
FIG. 11 is a perspective view of a mold insert member used to modify the male mold to form the top cover of the container illustrated in FIG. 4.
Figure 12:
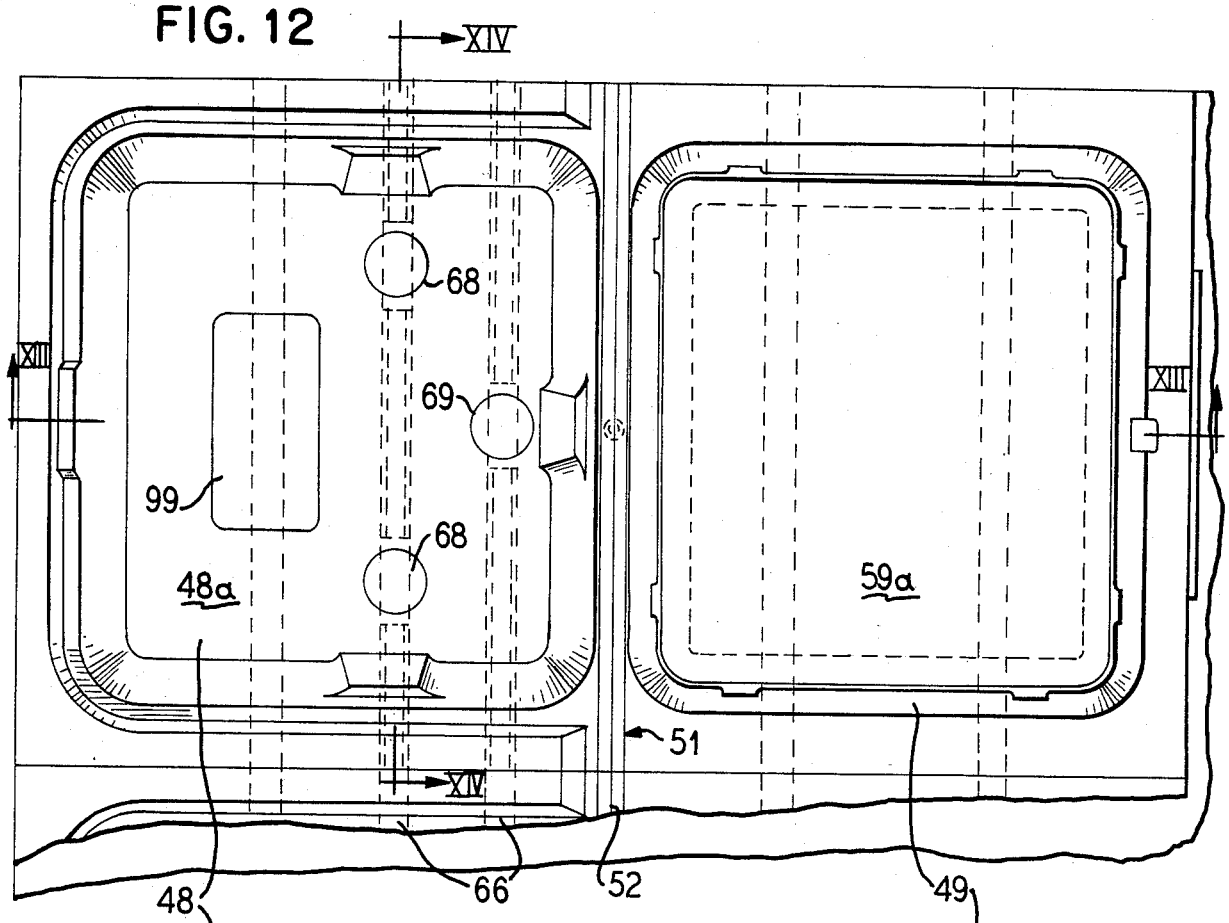
FIG. 12 is an enlarged fragmentary top plan view of a female forming mold for forming a food container of the type illustrated in FIG. 4.

In order to allow for the quick change of the molds 76 and 77 various types of mounting bosses and plugs can be used in combination with the rods 66 in much the same way as has already been described in connection with the construction and operation of the female molds which are designed for interaction with the male molds 76 and 77 thus comprising the side-by-side mold sets 43 and 44. From a consideration of FIGS. 9 and 15 it will be seen that the male mold base plate 75 has a series of sockets 78 cooperable with the forming mold 76 and a second series of sockets 79 cooperable with the male cover forming mold 77. As indicated, the male tri-compartment forming mold 76 is particularly constructed to produce a dish-shaped container member of the type shown at 12 in FIGS. 1 and 2 when operated with a female mold member of the type illustrated in FIG. 6 using a divider member as illustrated at 55 in FIG. 7. Now where it may be desired to produce a modified type of container such as the container illustrated at 31 in FIG. 4, then it is necessary to secure a three-sectional divider mold insert 80 (FIG. 10) to fill the slotted area 81a of the male tri-compartment forming mold 76. To this end, bosses or plugs 81 are employed. These plugs or bosses are virtually identical to the ones previously identified at 60 in FIG. 6. More specifically, bolts 82 (FIG. 16) are employed to secure the three-sectional divider mold insert 80 with the plug 81 and then the quick change rods 66 can be used to firmly secure the insert 80 to the mold 76 and more particularly to its plate 75 as illustrated in FIGS. 9, 15, 16 and 17.

Figure 16:
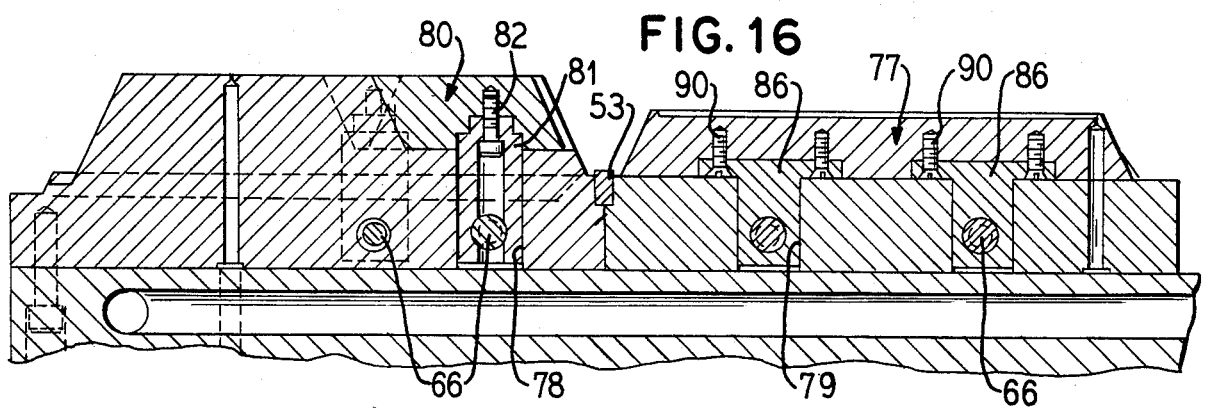
FIG. 16 is a vertical section view taken on the line XVI—XVI looking in the direction indicated by the arrows as seen in FIG. 15.

In FIG. 9 it will also be seen that the male cover forming mold 77 is adapted to be secured to the male mold base plate by means of a series of attachment bosses or plugs 86 each having a cap end 87 with mounting holes 88 and a horizontally disposed rod receiving passage 89. Screws or bolts 90 are employed for securing the attachment bosses or plugs 86 to the male cover forming mold 77, as seen in FIG. 16. In order to assemble the mold 77 to the male mold base plate 75, the quick change rods 66 can be employed. These rods extend through horizontally positioned passages or holes 91 in the male mold base plate. When the rod 66 is extended into the passages 91 they can be caused to be secured in the aligned passages 82 and 89 in the plugs 81 and 86, as example, thereby fixedly connect the three-sectional divider mold insert 80 and the male cover forming mold 77 in proper locked position on the male mold base plate 75.

Where it is desired to manufacture a container of the type shown in FIG. 4, a modified type of male cover forming mold 92 can be employed. It is adapted to be attached to the male mold base plate 75 in the same manner that the mold 77 is attached.

Now when the package maker desires to produce a container 30 as shown in FIG. 3, pronged male filler inserts (FIG. 9) 93 are usable to fill selected portions of the male tricompartment forming mold 76. Also for the same purpose, a bi-compartment male forming filler insert (FIG. 9) 94 is employed for filling a leg slot portion 81a of the male tri-compartment forming die 76. To this end, it will be appreciated that the filler plug 81 is attachable to the insert 94 by means of a threaded bolt in the same way as previously described. Also, the rod 66 is provided to anchor this subassembly by causing it to pass through the passageway 80, as previously described. The inserts 93, 93 are also insertable into the sockets 78 provided in the male mold for the added purpose of filling out the grooved areas 78a which lie above the sockets 78—78.

The rods 66 further provide means for individually detachably securing the different inserts including 77, 80, 81, 86, 92, 93 and 94 in place on the male molds. These inserts can be interchangeably used and in different combinations as needed and all as previously discussed herein.

With both the male and the female molds, it will be observed that the locking rod 66 has rod enlargements 66a which are positioned along the legs of the rods so that they can be specifically lodged within the holes or passageways provided in the particular plug or filler at an end where required to insure that the inserts and fillers will be properly secured during press operation. The remainder of the rod 66 is of a reduced diameter to minimize frictional movement of the rod as it is moved into and out of assembly with the associated mold.

Figure 13:
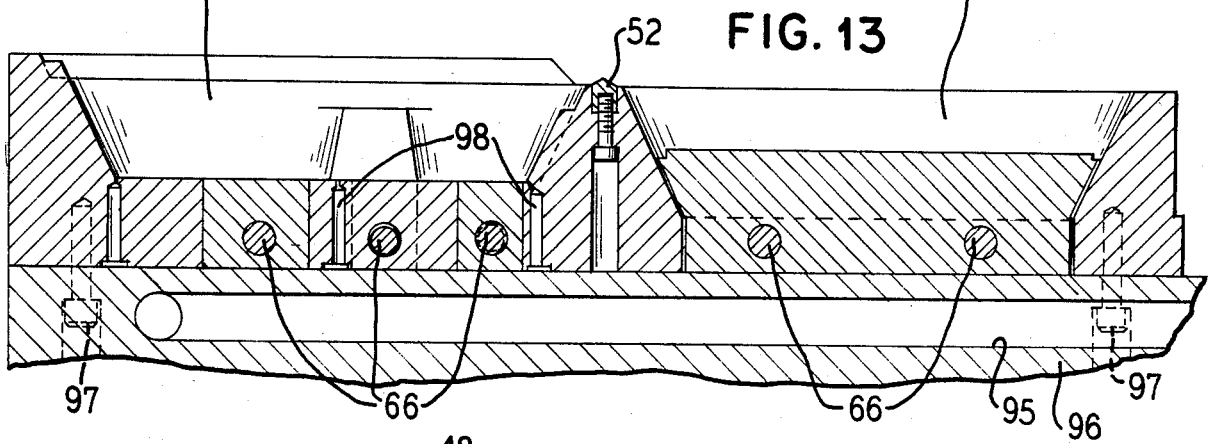
FIG. 13 is a vertical section view taken on the line XIII—XIII looking in the direction indicated by the arrows as seen in FIG. 12.
Figure 14:
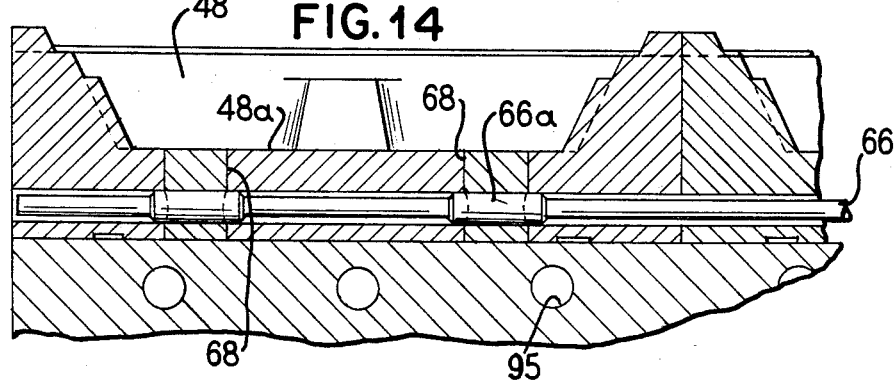
FIG. 14 is a vertical section view taken on the line XIV—XIV looking in the direction indicated by the arrows as seen in FIG. 13.
Figure 15:
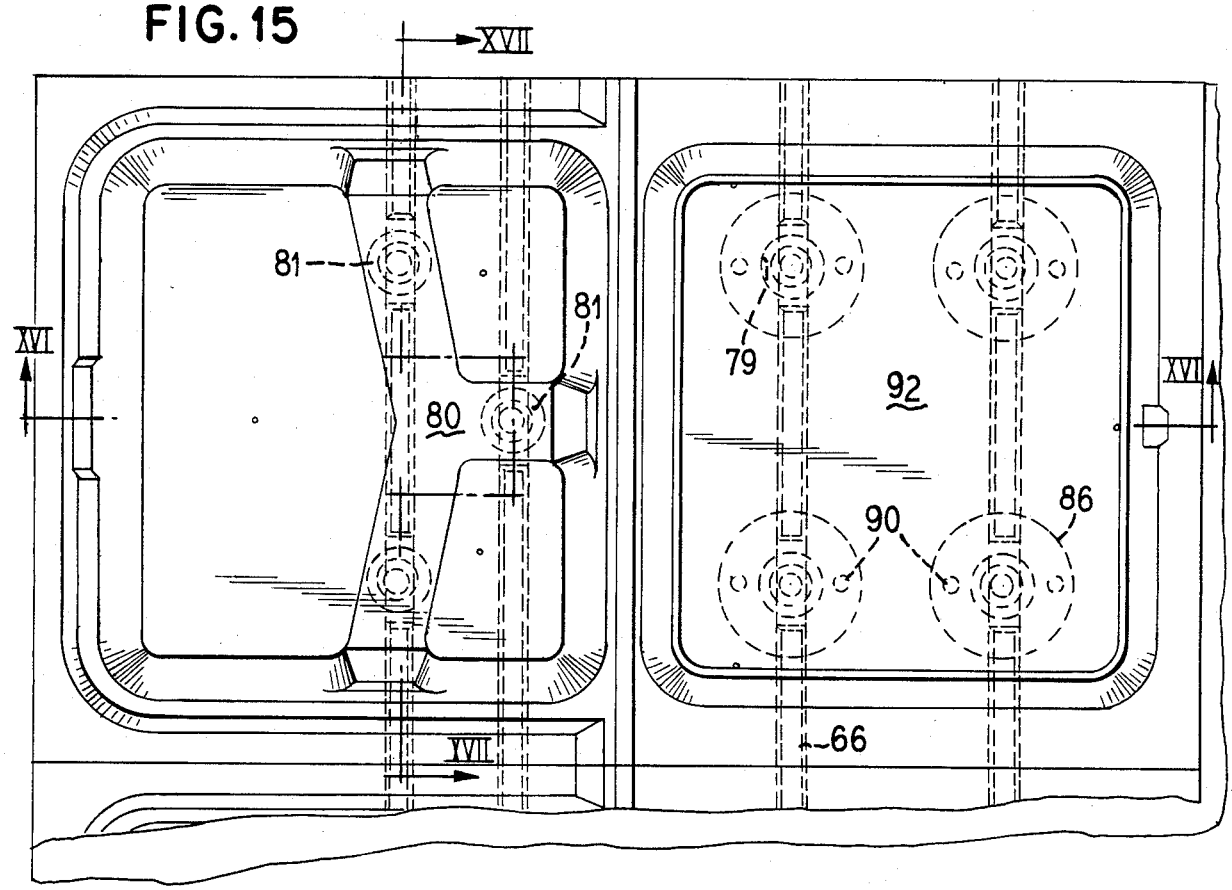
FIG. 15 is an enlarged fragmentary top plan view of a male forming mold for forming a food container of the type shown in FIG. 4.
Figure 17:
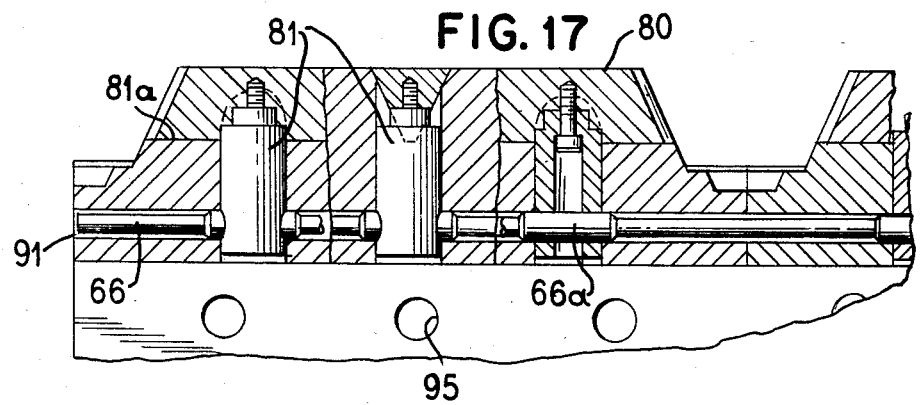
FIG. 17 is a vertical section view taken on the line XVII—XVII looking in the direction indicated by the arrows as seen in FIG. 15.

It will be seen in FIGS. 13 and 17 that water cooling passageways 95 are provided for cooling of the molds with chilled water which molds are preferably comprised of aluminum or other suitable material which facilitates rapid heat transfer for cooling. This illustration is diagrammatic since the concept of using water to chill molds is well known in the art. This passageway 95 is provided in the mounting base or base plate 96 which is secured by fasteners 97 to the female molds as illustrated in FIG. 13. Still further, vacuum passageways 98 are diagrammatically shown in FIG. 15 to point out that the formation of the hot synthetic plastic sheet in the press operation can be facilitated by using a vacuum with the vacuum passageways 98. The use of vacuum as a vacuum assist in forming operations of this type is well known in the art and further illustration is not here believed to be necessary.

Still further, where the package manufacturer desires to provide imprinting upon the container 10, a vacuum plate such as a vacuum assist in forming operations of this type is well known in the art and further illustration is not here believed to be necessary.

METHOD

Method for forming containers from a sheet or sheets of synthetic plastic materials has in part already been described in connection with the foregoing statements explaining the operation of the apparatus. The containers can be made having different interior configurations by selectively choosing different combinations of the inserts and arranging them to have the capability of producing containers of different types as shown in FIGS. 1-4 inclusive. Further, the method further contemplates the selective formation of cup holders in the upper dish-shaped container member where desired and my method contemplates forming such cup holders on anyone of the three different containers shown in FIGS. 1-4.

In the practice of my method it is contemplated that the components will be oriented so that opposed relatively movable male and female mold sets are provided as shown in FIGS. 5 and 5A and in succeeding Figures. Each of the mold sets is provided with bottom means which may be formed integral as part of the mold cavities as illustrated at 48 and 49 in FIG. 6 and as further including the base plate 96 which are secured by the fasteners 97 to the female molds. The male forming molds include the base plate 75. It will further be noted that my method includes the provision of means for attaching inserts to the bottom means which includes those different groupings of inserts which are secured by the rods 66 to the female and male mold sets including inserts 55, 55a, 56, 57, 58, 59, 59a, 68 and 65, as a first grouping of inserts and 77, 80, 81, 86, 92, 93 and 94 as a second grouping of inserts. The method also contemplates providing these first and second inserts with different projecting configurations to establish a male-female mold relationship between them. Thereafter, the method contemplates selecting a first group of inserts consisting of at least one of the first plurality of inserts and one of the second plurality of inserts, then attaching the first group to the bottom portions, then operating the male and female molds to produce a container from sheet material positioned between the male and female molds, the container having a first interior configuration. Thereafter removing the first group of inserts from the bottom portions, then selecting a second group of inserts for forming a container having a second configuration all as described in connection with producing the different containers shown in FIGS. 2, 3 and 4. The method then contemplates repeating the steps previously stated only selecting a second group of inserts for forming the container having the second configuration and so on. Thus, a manufacturer of containers can now have a single mold press with different mold sets and can quickly and easily modify the grouping of the inserts to produce different types of containers thereby reducing the capital expense normally required where a different press and set-up would be needed to produce each type of container.

I claim:

1. A plastic molding apparatus for forming three dimensional containers from a single sheet of synthetic plastic material, each container comprising side-by-side generally dish-shaped container members which are hinged together, said dish-shaped members having different interior configurations with respect to one another, and which apparatus comprises opposed relatively movable base means, opposed relatively movable pairs of male and female mold members carried by said base means, at least one of said male and female mold members of each of said male and female mold members having peripheral product forming surfaces defining the outer boundaries of a container to be molded by said pair of said male and female mold members, a first plurality of different inserts having different projecting configurations for selective attachment to a first member of each of said pair of male and female mold members, a second plurality of different inserts having different projection configurations for selective attachment to a second member of each of said pair of mold members having surfaces complimentary to the first plurality of inserts to establish a male/female mold relationship between said first and second plurality of inserts, quick change means for individually detachably securing the plurality of first and second inserts to an associated mold member and thus enabling the molds to produce containers having selected variable predetermined physical characteristics determined by said plurality of inserts without change of said first and second members or said base means, means on said male and female mold members for producing a hinge between the dish-shaped members, said quick change means comprising locking rod means carried by said mold members, said inserts having opening means cooperating with said rod means for locking said inserts into assembly with said associated mold member.

2. The apparatus of claim 1 further characterized by the quick change means comprising locking rods mounted on the mold members, the inserts having openings through which the locking rods are extendable for locking the inserts into assembly with the associated mold member, the inserts being male and female types thus requiring that where an insert is changed in one of the mold members it must also be changed in the corresponding opposed mold member.

3. The apparatus of claim 2 further characterized by the mold members having rod openings for receipt of the locking rods for journalling the rods therein and for securement of the inserts in assembly therewith.

4. The apparatus of claim 1 further characterized by the inserts being mounted on the opposed mold members in position for forming dish-shaped indentations in side-by-side relation in only one of the generally dish-shaped container members for supporting one or more beverage cups on top of the container when the dish-shaped container members of the container are in a closed superimposed position with respect to one another.

5. The apparatus of claim 1 further characterized by the mold members being comprised of aluminum and having coolant passageways for allowing coolant to be circulated through the mold members for cooling of the synthetic plastic material after it is formed into shape.

6. The apparatus of claim 1 further characterized by the mold members having bottoms with insert openings provided therein, the inserts having bottoms with projections extending therefrom, the projections dimensioned to be received in the insert openings, the quick change means comprising locking rods mounted on the mold members and extending through rod openings therein which rod openings intersect with the insert openings, the rods being provided for locking the inserts in the mold bottoms, a blind lock plug having a hole in its base insertable into the insert opening for filling the insert opening wherein an insert is not to be used and with the locking rod serving to secure the blind lock plug in assembly with the mold bottom.

7. The apparatus of claim 1 further characterized by the inserts being so arranged with respect to the mold members for producing tri-divided type of container for one of the opposed generally dish-shaped container members and with the other dish-shaped member being undivided.

8. The apparatus of claim 1 further characterized by providing inserts in one of the opposed mold members in position for forming dish-shaped indentations in side-by-side relation in only one of the generally dish-shaped container shaped members for supporting one or more beverage cups on top of the container when the dish-shaped container members are in a folded closed superimposed position with respect to one another.

9. The apparatus of claim 1 further characterized by three inserts being mounted on one of the opposed die members in side-by-side relation for forming dish-shaped indentations and a ledge therebetween in only one of the generally dish-shaped container members for supporting one or more beverage cups and condiment packages on top of the container in the indentations and on the ledge when the dish-shaped container members of the container are in a closed superimposed position with respect to one another.

10. A mold set for molding hinged containers from non-metallic sheet material comprising male and female mold members, each of said members including a bottom wall defining portion and a peripheral portion, the peripheral portion projecting away from the bottom wall defining portion, said bottom wall defining portion including means for affixing at least selected ones of a plurality of inserts thereto, said inserts including inserts projecting from said base portions and inserts complementary to said projecting inserts having portions thereof lying below a surface of said bottom portion, quick change means for changing said inserts, said quick change means including bores in said bottom wall defining portion and projections on said inserts for insertion into said bores and lock means retaining said projections in said bores and plug inserts for said bores for levelling portions of said bottom portion at the points of attachment of said inserts when said inserts are not used.

11. The mold set of claim 10 wherein said bottom wall defining portion of at least one of said mold members comprises an insert receivable within a peripheral portion of said mold member, said bottom wall defining portion having transverse bores therethrough alignable with transverse bores in said mold member, locking rods receivable through each of said transverse bores to lock said bottom wall defining portion in said mold member, said bottom wall defining portion being exchangeable with additional bottom wall defining portions having different height dimensions whereby the depth of the container molded by said mold set is variably by changing bottom wall defining portions.

12. A plastic molding apparatus for forming three-dimensional containers from a single sheet of plastic material and each container comprising side-by-side generally dish-shaped members which dish-shaped members have different interior configurations with respect to one another and which apparatus comprises a pair of opposed relatively movable male and female mold members, a pair of differently configurated side-by-side mold sets carried by said mold members, a first plurality of different inserts having different projecting configurations for said first mold set, a second plurality of different inserts for said second set and having surfaces complementary of the first projecting inserts to establish a male-female mold relationship between said first and second plurality of inserts, bosses cooperable with said inserts of the first and second plurality of different inserts, means attaching said bosses to said inserts, the bosses having rod receiving passageways therein, quick change rods extendable through said rod receiving passageways in said bosses and through passageways in said mold members for individually detachably securing the first and second inserts to the associated male and female mold members and thus enabling the molds to produce containers having variable predetermined physical characteristics depending upon the selection and the arrangement of the inserts, and power means for operating the mold members to produce the side-by-side dish-shaped members from the single sheet of material positioned therebetween.

13. The apparatus of claim 12 further characterized by the rods having spaced enlargements along the lengths thereof which are specifically engageable in the rod receiving passageways in said bosses to firmly lock the bosses in place with respect to the associated one of the mold members.

14. The apparatus of claim 12 further characterized by the mold members having coolant receiving passageways for cooling the mold members to facilitate the formation of the containers.

15. The apparatus of claim 12 further characterized by the inserts being selectively arrangeable and interchangeably secured to the mold members for forming a tri-compartment container.

16. The apparatus of claim 12 further characterized by the inserts being selectively arrangeable and interchangeably secured to the mold members for forming bi-compartment containers.

17. The apparatus of claim 12 further characterized by the inserts being selectively arrangeable and interchangeably secured to the mold members for forming an individual container having only a single compartment.

18. The apparatus of claim 12 further characterized by the inserts being selectively arrangeable and interchangeably secured to the mold members and including female cover inserts of selected thickness selectively mountable in the female mold for forming a container having dish-shaped container members of selected variable depths as required.

19. The apparatus of claim 12 further characterized by the male and female mold sets having a knife assembly operable to form a hinged area in the synthetic plastic material as the dish-shaped containers are formed.

* * * * *